(12) United States Patent
Chunn et al.

(10) Patent No.: US 11,585,424 B2
(45) Date of Patent: Feb. 21, 2023

(54) MODULAR PINION SHAFT FOR RECIPROCATING PUMPS

(71) Applicant: FORUM US, INC., Houston, TX (US)

(72) Inventors: Austin Chunn, Fort Worth, TX (US); Wesley Freed, Aledo, TX (US); Mark C. Dille, Magnolia, TX (US)

(73) Assignee: FORUM US, INC., Houston, TX (US)

( * ) Notice: Subject to any disclaimer, the term of this patent is extended or adjusted under 35 U.S.C. 154(b) by 545 days.

(21) Appl. No.: 16/804,290

(22) Filed: Feb. 28, 2020

(65) Prior Publication Data
US 2020/0200255 A1   Jun. 25, 2020

Related U.S. Application Data

(62) Division of application No. 15/407,888, filed on Jan. 17, 2017, now Pat. No. 10,612,643.

(51) Int. Cl.
| | |
|---|---|
| *F16H 57/00* | (2012.01) |
| *C21D 9/08* | (2006.01) |
| *F04D 29/05* | (2006.01) |
| *F16C 3/02* | (2006.01) |
| *F16D 1/06* | (2006.01) |
| *C21D 9/32* | (2006.01) |
| *F16D 1/033* | (2006.01) |
| *F04D 29/053* | (2006.01) |
| *F04D 29/044* | (2006.01) |

(Continued)

(52) U.S. Cl.
CPC ........... *F16H 57/0025* (2013.01); *C21D 9/08* (2013.01); *C21D 9/32* (2013.01); *F04D 29/043* (2013.01); *F04D 29/044* (2013.01); *F04D 29/053* (2013.01); *F04D 29/054* (2013.01); *F16C 3/023* (2013.01); *F16D 1/02* (2013.01); *F16D 1/033* (2013.01); *F16D 1/06* (2013.01); *F16H 57/0018* (2013.01)

(58) Field of Classification Search
CPC ... F16H 57/0025; F16H 57/0018; C21D 9/08; C21D 9/32; F04D 29/043; F04D 29/044; F04D 29/053; F04D 29/054; F16C 3/023; F16D 1/02; F16D 1/033; F16D 1/06
See application file for complete search history.

(56) References Cited

U.S. PATENT DOCUMENTS

| | | |
|---|---|---|
| 1,610,758 A | 12/1926 | Downer |
| 1,637,944 A | 8/1927 | Keller |

(Continued)

FOREIGN PATENT DOCUMENTS

DE   102013000427 A1   7/2014

OTHER PUBLICATIONS

Office Action issued in Canadian Patent Application No. 2,986,982, dated Aug. 6, 2019 (7 pages).

(Continued)

*Primary Examiner* — Jacob M Amick
(74) *Attorney, Agent, or Firm* — Patterson + Sheridan, LLP (57) ABSTRACT

A modular pinion shaft that includes a tubular member having a first end and a second end, a first pinion gear member secured to the first end by a plurality of fasteners, and a second pinion gear member secured to the first end by a plurality of fasteners. Gear teeth of each of the pinion gear members are aligned by one or more indexing members disposed between the tubular member and each pinion gear member.

20 Claims, 5 Drawing Sheets

(51) Int. Cl.
    *F04D 29/043* (2006.01)
    *F16D 1/02* (2006.01)
    *F04D 29/054* (2006.01)

(56) References Cited

U.S. PATENT DOCUMENTS

| | | | |
|---|---|---|---|
| 3,447,392 A | 6/1969 | Kawchitch | |
| 3,696,685 A | 10/1972 | Lampredi | |
| 3,734,073 A | 5/1973 | Walter et al. | |
| 4,407,598 A | 10/1983 | Hendershot | |
| 4,425,816 A | 1/1984 | Toyoda | |
| 4,468,174 A | 8/1984 | Pryor | |
| 4,665,766 A | 5/1987 | Umeha et al. | |
| 4,884,916 A | 12/1989 | Johnson, III | |
| 5,142,783 A | 9/1992 | Melzer et al. | |
| 5,174,169 A | 12/1992 | Allen | |
| 5,302,046 A | 4/1994 | Mathes | |
| 5,342,464 A | 8/1994 | McIntire et al. | |
| 6,315,487 B1 * | 11/2001 | James | F16D 3/387 464/182 |
| 6,912,927 B2 | 7/2005 | Eberle | |
| 7,004,730 B1 | 2/2006 | Williams | |
| 2006/0120798 A1 | 6/2006 | Guarino | |
| 2007/0147955 A1 | 6/2007 | Moore | |
| 2009/0028636 A1 | 1/2009 | Kirschey | |
| 2009/0085350 A1 * | 4/2009 | Muzzo | F16L 23/22 285/336 |
| 2010/0022317 A1 | 1/2010 | Burgbacher et al. | |
| 2010/0307275 A1 | 12/2010 | Kopf et al. | |
| 2010/0322802 A1 | 12/2010 | Kugelev | |
| 2011/0146053 A1 | 6/2011 | Chevrette | |
| 2012/0220401 A1 | 8/2012 | Kida | |
| 2014/0299109 A1 | 10/2014 | Fuqua et al. | |
| 2017/0248151 A1 | 8/2017 | Nelson et al. | |

OTHER PUBLICATIONS

Maury Microwave Corporation, Precision WR22 and WR19 Waveguide Flanges. Retrieved from https://www.maurymw.com/pdf/datasheets/5E-030.pdf (1996).

Mexico Office Action dated Oct. 25, 2021, for Mexico Patent Application No. MX/a/2017/016118.

* cited by examiner

MODULAR PINION SHAFT FOR RECIPROCATING PUMPS

CROSS-REFERENCE TO RELATED APPLICATIONS

This application is a divisional of U.S. patent application Ser. No. 15/407,888, filed on Jan. 17, 2017, the contents of which are herein incorporated by reference in their entirety.

BACKGROUND

Field

Embodiments of the disclosure relate to a modular pinion shaft used in pressurized fluid delivery systems, such as reciprocating pumps commonly used in the oil and gas industry.

Description of the Related Art

Pressurized fluid delivery systems utilized in the oil and gas industry include fracturing pumps and mud pumps. These types of pumps are frequently driven by a single pinion shaft, or drive shaft, that is engaged at opposing ends with bull gears of a crankshaft. Alignment of the gear teeth between the pinion shaft and the bull gears is critical to prevent damage. Errors of even a few microns in the alignment influence gear capacity and life.

Pinion shafts are typically machined from a single piece of high quality tool steel that is subsequently heat treated. Teeth for engaging the bull gear teeth are machined on opposing ends of the single piece shaft. Timing of the teeth between the pinion shaft and the bull gears requires the manufacturer to hold tight tolerances.

While lengths of the pinion shafts vary, manufacture of the pinion shafts requires larger, more expensive machines, as well as larger heat treating furnaces. In addition, tolerances, particularly in the gear teeth on opposing ends of the pinion shaft, are difficult to hold as length increases. These problems make manufacturing difficult and expensive, and errors in gear timing may shorten the lifetime of the pinion shaft and/or the bull gears. Additionally, when the gear teeth fail, the entire pinion shaft must be replaced.

Therefore, there exists a need for new and improved pinion shafts.

SUMMARY

In one embodiment, a modular pinion shaft includes a tubular member having a first end and a second end. A first pinion gear member is secured to the first end by a plurality of fasteners. A second pinion gear member is secured to the first end by a plurality of fasteners. Gear teeth of each of the pinion gear members are aligned by one or more indexing members disposed between the tubular member and each pinion gear member.

In one embodiment, a method for manufacturing a pinion shaft includes securing a first pinion gear member to a first end of a tubular by a plurality of fasteners, securing a second pinion gear member to a second end of the tubular member by a plurality of fasteners, and providing one or more indexing members disposed between the tubular member and each pinion gear member.

BRIEF DESCRIPTION OF THE DRAWINGS

Having generally described the various embodiments of the disclosure, reference will now be made to the accompanying drawings.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments described herein relate to a pinion shaft having a robust modular (e.g. multi-piece) design that is easier and cheaper to manufacture, provides enhanced serviceability, and minimizes operational issues as compared to conventional single piece pinion shafts. As the need for larger and long pinion shafts increases, the drawbacks and costs of conventional single piece pinion shafts also increase due to the need for larger, more expensive equipment to handle, machine, and heat treat such large pinion shafts. Further, holding tight tolerances of gears at one end of the pinion shaft to gears at the other end becomes more difficult over long distances, which may disrupt critical gear timing.

Figure 1:
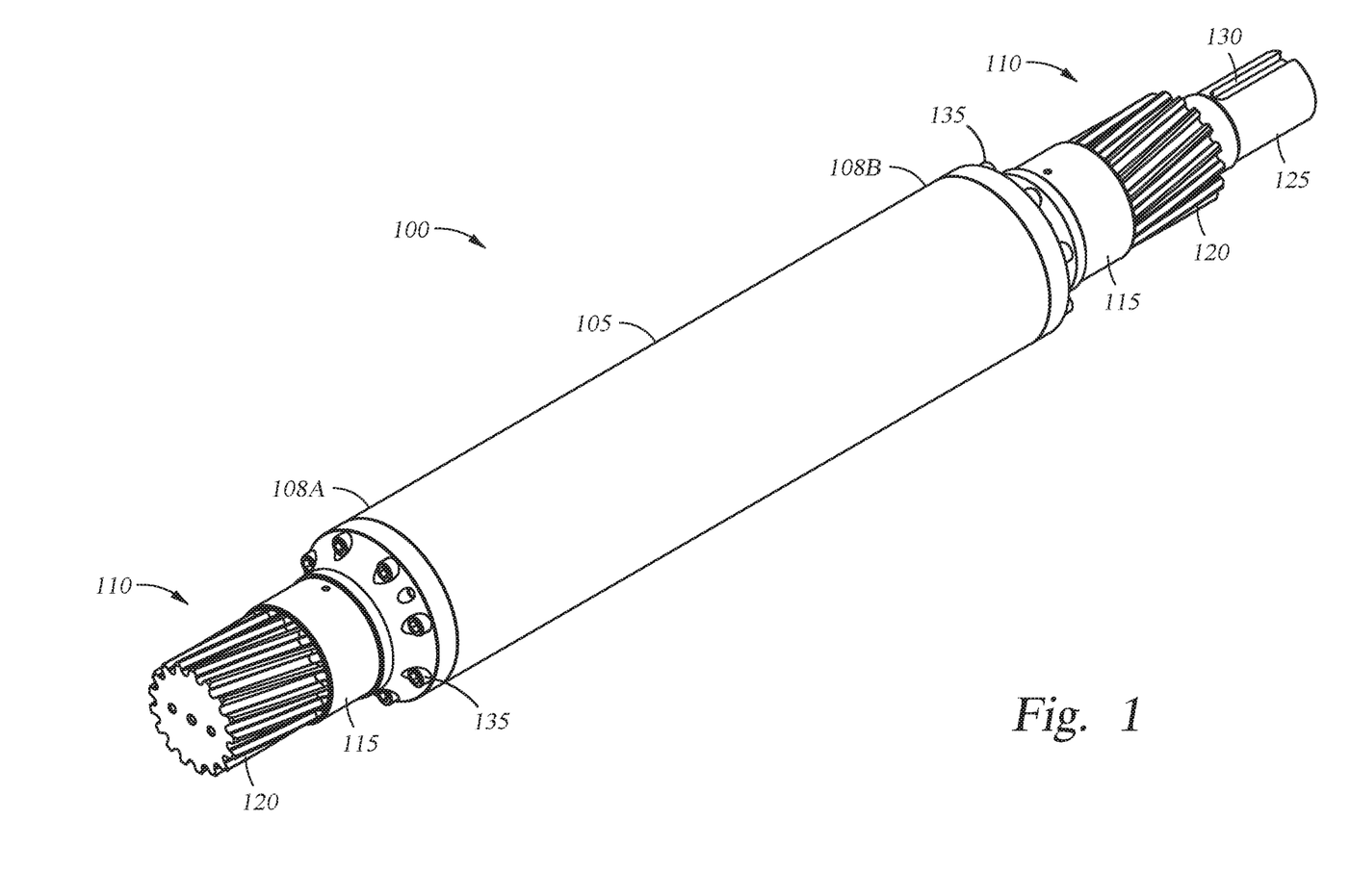
FIGS. 1 and 2 are isometric views of a modular pinion shaft according to one embodiment.
Figure 2:
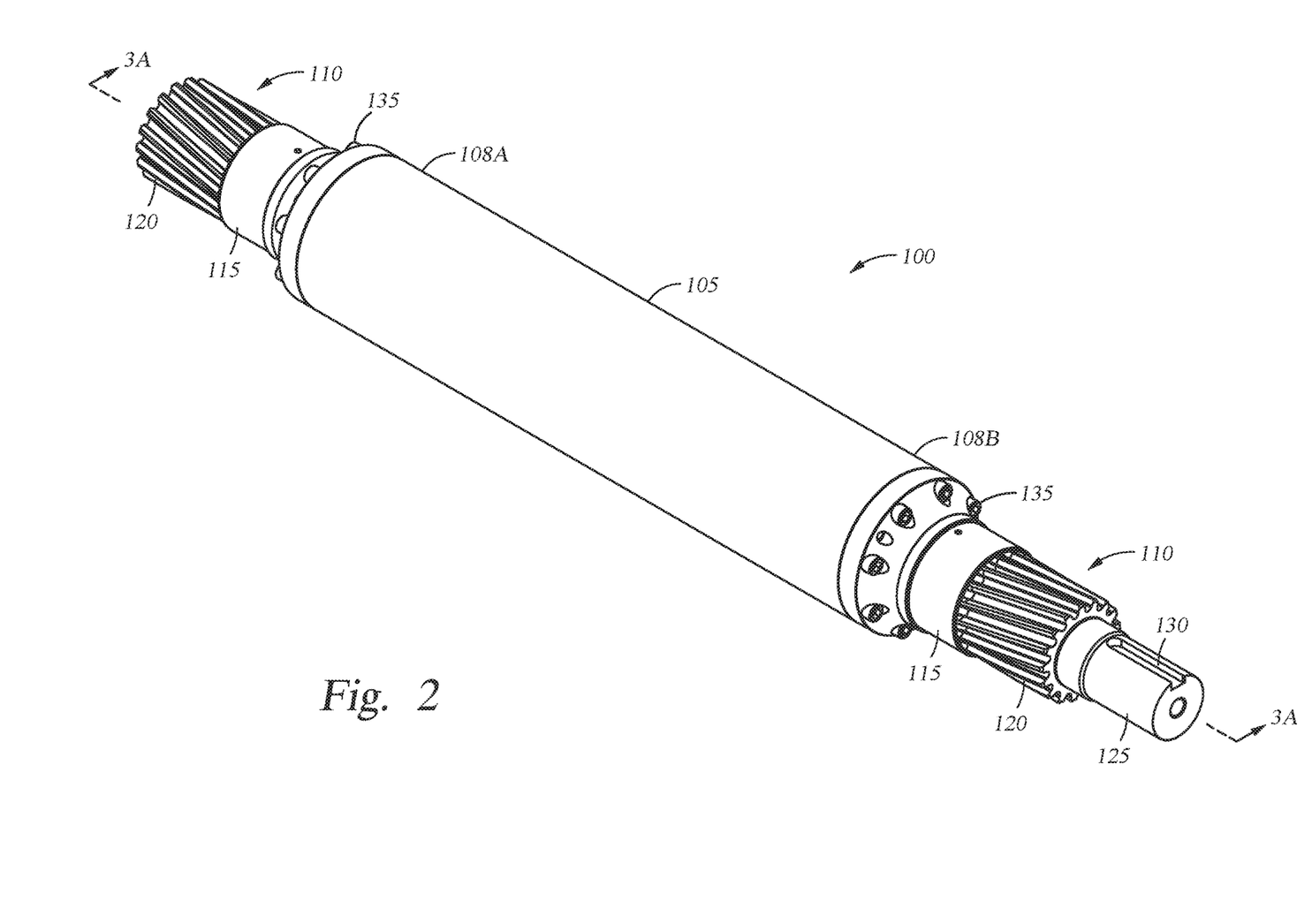

FIGS. 1 and 2 are isometric views of a modular pinion shaft 100 according to one embodiment. The modular pinion shaft 100 includes a tubular member 105 having a first end 108A and a second end 108B. Each of the first end 108A and the second end 108B include a coupling interface for attaching pinion gear members 110 to the tubular member 105.

In the embodiment shown, each of the pinion gear members 110 may include a bearing surface 115 positioned inwardly of gear teeth 120. However, in other embodiments, the gear teeth 120 may be located inward of the bearing surface 115. One of the pinion gear members 110 may include an extended shaft portion 125 for coupling with a power source, such as a motor. The extended shaft portion 125 may include a keyway 130, such as a groove, formed along a longitudinal length of the extended shaft portion 125. In one embodiment, the extended shaft portion 125 may include splines formed along a longitudinal length of the extended shaft portion 125 instead of or in addition to the keyway 130.

Fasteners 135, such as bolts, may be used to secure the pinion gear members 110 to the tubular member 105. In contrast to conventional pinion shafts, which are machined from a single piece of material, the pinion gear members 110 are removable and replaceable. Thus, a damaged pinion gear can be replaced with a new pinion gear member 110. This saves costs as the entire modular pinion shaft 100 would not need to be replaced.

Figure 3A:
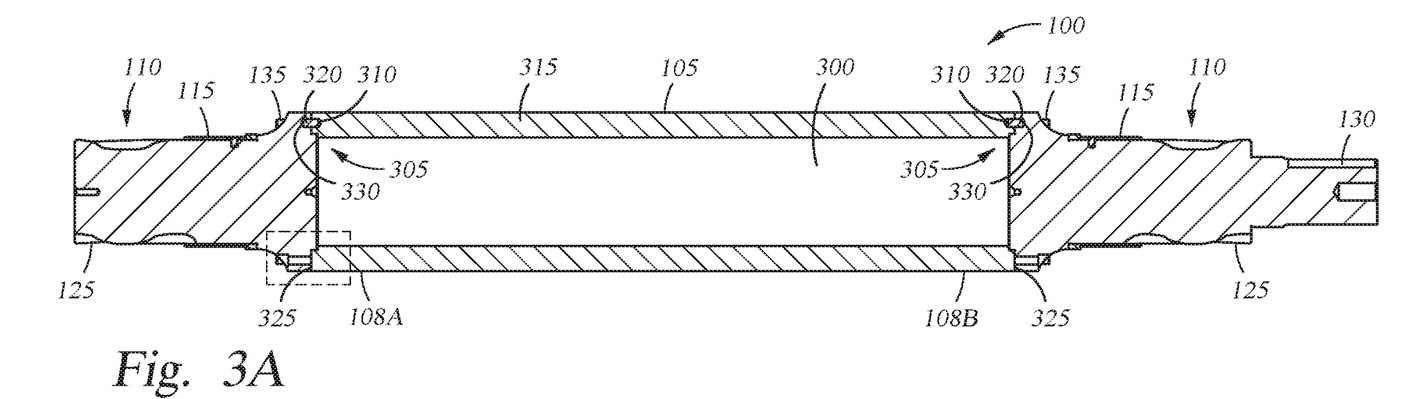
FIG. 3A is a sectional view of the modular pinion shaft along lines 3A-3A of FIG. 2.

FIG. 3A is a sectional view of the modular pinion shaft 100 along lines 3A-3A of FIG. 2. The tubular member 105 includes a hollow center 300 which decreases the weight of the modular pinion shaft 100. Coupling interfaces 305 between the tubular member 105 and the pinion gear members 110 are shown in FIG. 3A. Each coupling interface 305 may include a first bore 310 formed in a wall 315 of the tubular member 105. The first bore 310 may be utilized to receive an indexing member 320, which may be a pin.

The indexing member 320 may partially extend from faces 325 of the tubular member 105 at each of the first end 108A and the second end 108B. The extending portion of the indexing member 320 may be received in a second bore 330, such as a mating bore, formed in the pinion gear members 110. The indexing member 320 may be used to ensure that the gear teeth 120 of the pinion gear members 110 are aligned properly relative to each other and/or relative to any gears that will mate up with the pinion gear members 110 for correct gear timing.

Figure 3B:
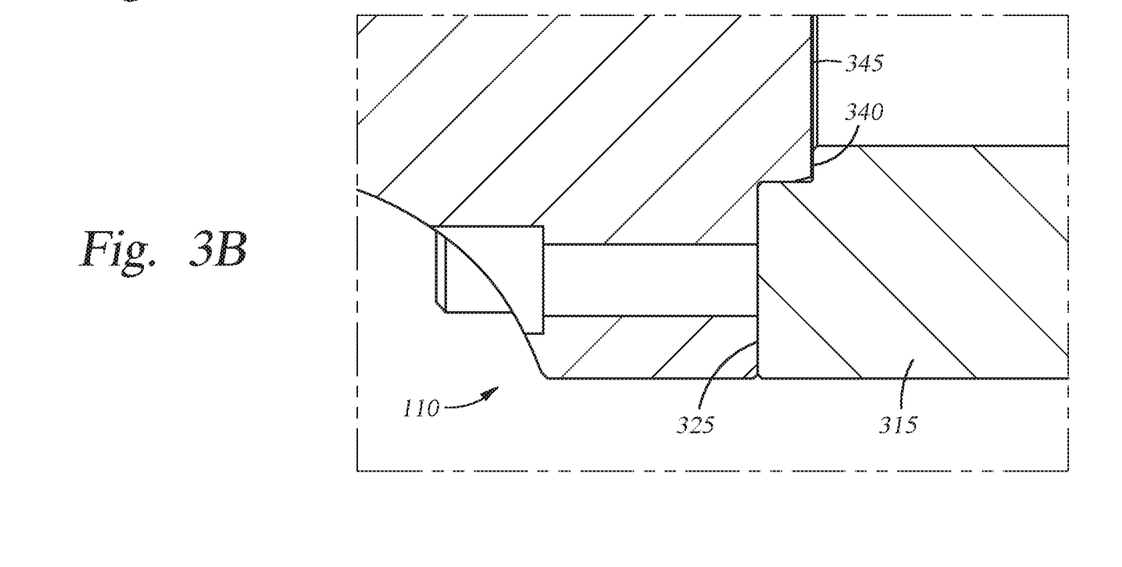
FIG. 3B is an enlarged view of a portion of the modular pinion shaft of FIG. 3A.

FIG. 3B is an enlarged view of a portion of the modular pinion shaft 100 of FIG. 3A. Each coupling interface 305 may include a recessed portion that receives a portion of the pinion gear member 110. The recessed portion is formed by a shoulder 340 of the wall 315 at the first end 108A and the second end 108B of the tubular member 105. The shoulder 340 may be formed in the face 325 of the tubular member 105 at the inside diameter of the tubular member 105. The pinion gear member 110 may include a face 345 that extends into the recessed portion and contacts the shoulder 340.

Figure 4:
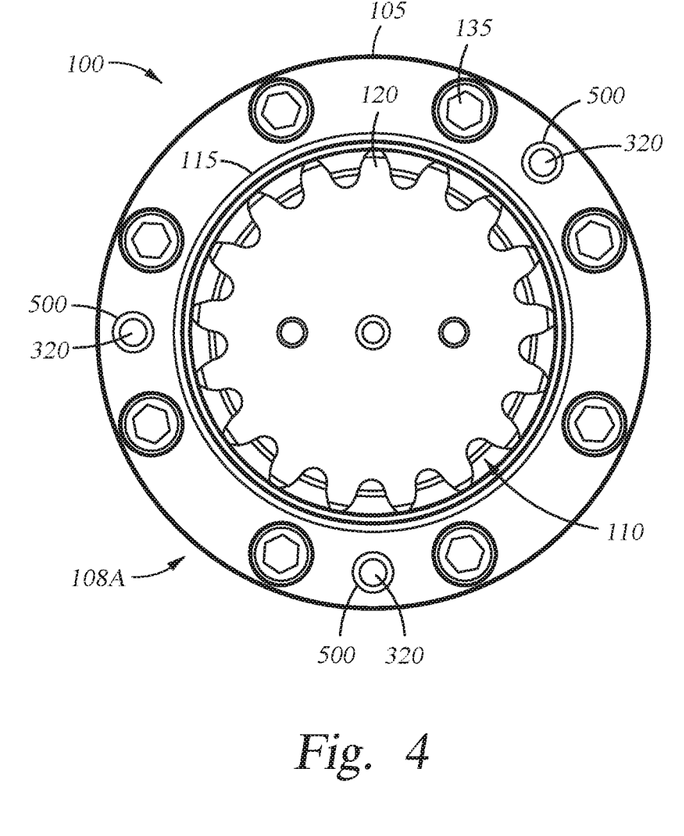
FIGS. 4 and 5 are end views of the modular pinion shaft.
Figure 5:
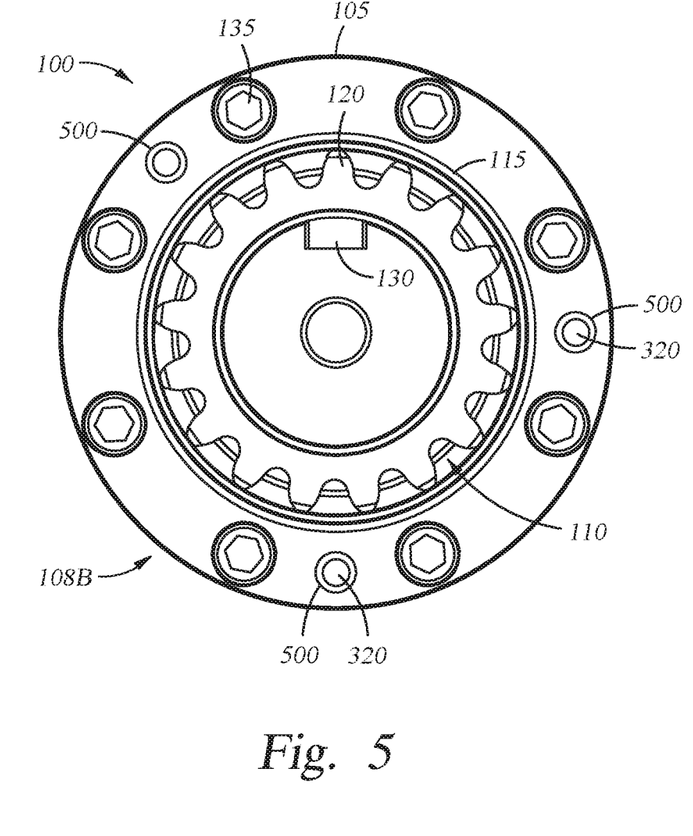

FIGS. 4 and 5 are end views of the modular pinion shaft 100. FIG. 4 shows the first end 108A of the modular pinion shaft 100, and FIG. 5 shows the second end 108B of the modular pinion shaft 100. The modular pinion shaft 100 may include one or more indexing members 320 on each of the first end 108A and the second end 108B. As shown in FIGS. 4 and 5, the indexing members 320 may be at least partially disposed in through-holes 500 (as opposed to a second bore 330 shown in FIG. 3A) formed in the pinion gear members 110 such that an end of each indexing member 320 is visible.

Figure 6:
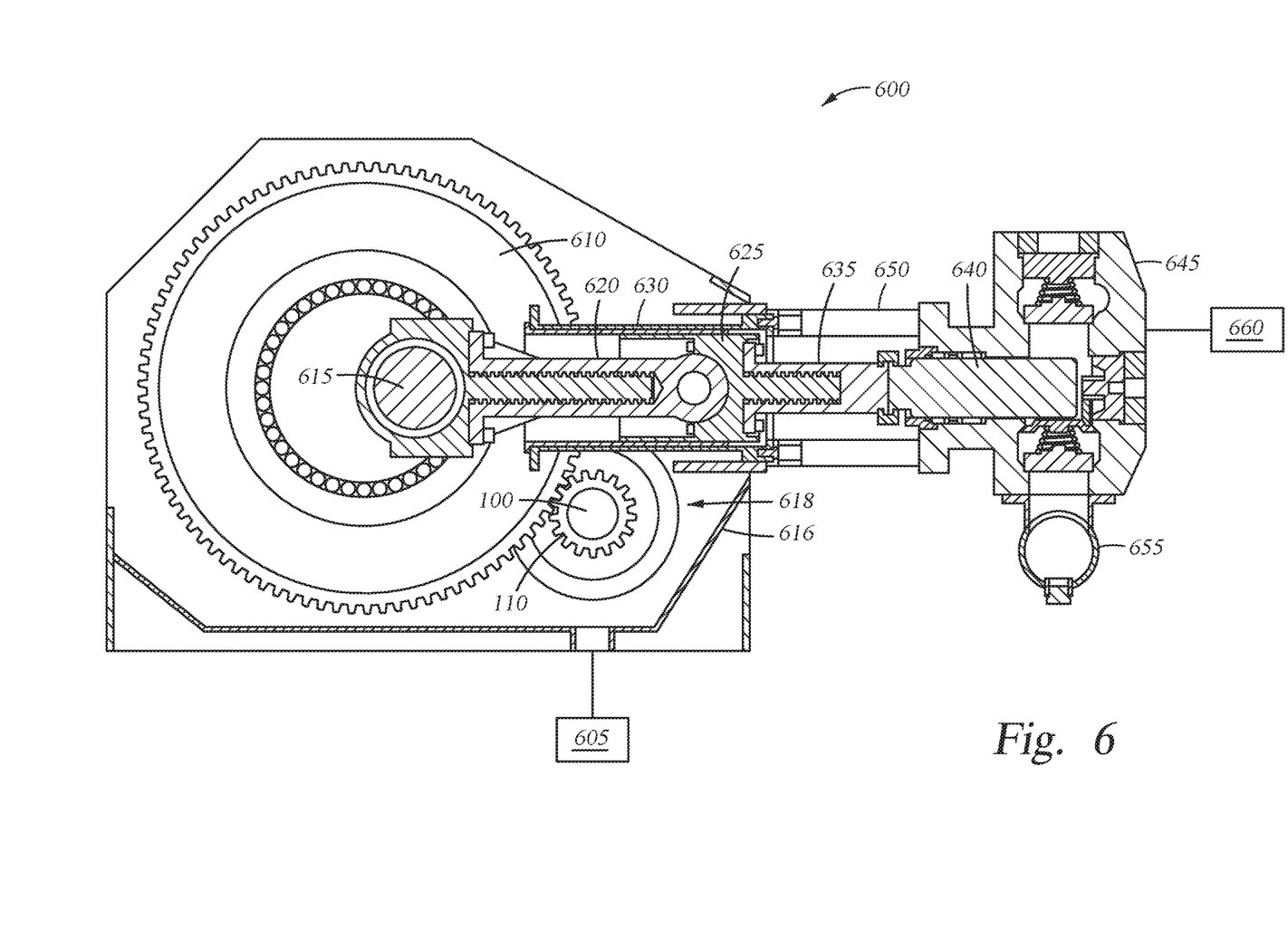
FIG. 6 is a schematic sectional view of a reciprocating pump where the embodiments of the modular pinion shaft may be utilized.

FIG. 6 is a schematic sectional view of a reciprocating pump 600 where the embodiments of the modular pinion shaft 100 may be used. The reciprocating pump 600 is of a type typically utilized for oil and gas well service operations, such as pumping high pressure fluid into a well to hydraulically fracture the reservoir. The reciprocating pump 600 may also be configured for pumping drilling fluid into the well during drilling.

The reciprocating pump 600 may include a power source 605, such as a motor, operably coupled to the modular pinion shaft 100 to rotate the modular pinion shaft 100. The modular pinion shaft 100 includes the pinion gear members 110 on both ends of the tubular member 105 (only one pinion gear member 110 is shown). The gear teeth on the pinion gear members 110 mate with gear teeth on corresponding bull gears 610 (only one bull gear 610 is shown) to drive the bull gears 610, which are connected to a crankshaft 615. The modular pinion shaft 100 is supported in a housing 616 of the reciprocating pump 600 by bearings 618 (only one is shown).

One or more connecting rods 620 are coupled to the crankshaft 615. Each connecting rod 620 is connected to a crosshead 625, and each crosshead 625 moves in a linear stroke within a stationary crosshead casing 630. A pony rod 635 secures each crosshead 625 to a plunger 640 disposed in a fluid end 645. Tie rods 650 connect the fluid end 645 to an end portion of the reciprocating pump 600. As the plunger 640 is stroked, fluid is brought into the fluid end 645 from an intake 655 and discharged at higher pressure out a discharge 660.

Timing of the gear teeth between the pinion gear members 110 of the modular pinion shaft 100 and the bull gears 610 is critical to the operation and performance of the reciprocating pump 600 and thus the fluid end 645. A principal factor of a properly timed reciprocating pump is ensuring that the gear teeth of the pinion shaft on one end exactly match the gear teeth of the pinion shaft on the other end in both size and orientation so that they mate correctly at each end with corresponding bull gears. The modular pinion shaft 100 as described herein minimizes tolerance errors as well as timing of the gear teeth by utilizing the indexing members 320 to ensure that the gear teeth on each of the pinion gear members 110 are properly aligned when coupled to the tubular member 105.

Also, reciprocating pumps operate in a harsh environment which may cause the gear teeth to fail due to bending, wear, or shear. When this happens to a conventional single piece pinion shaft, the entire pinion shaft must be replaced. However, the modular pinion shaft 100 as described herein allows the end user to replace one or both pinion gear members as needed, which reduces the cost of repairs by up to 80 percent.

Further, heat treating of a single piece pinion shaft after it has been machined may cause problems. Longer single piece pinion shafts tend to move (e.g. expand, bend, twist) during a heat treatment process, which makes it difficult to holding tight tolerances between the gears at opposite ends of the pinion shafts. The tubular member 105 and the pinion gear members 110 of the modular pinion shaft 100 however may be heat-treated separately, which increases the ability to control tolerances of the gears on the pinion gear members 110 and reduces the size of the furnace needed for heat treatment compared to heat treating a very long single piece pinion shaft. The tubular member 105 of the modular pinion shaft 100 may be machined after heat treating so that the material properties can be optimized.

Another issue inherent with a single piece pinion shaft is that the material is exactly the same for the gear teeth and the middle portion of the single piece pinion shaft. However, the material of the tubular member 105 and the pinion gear members 110 may be different and may be chosen as needed for optimal performance of the modular pinion shaft 100. For example, one pinion gear member 110 at one end of the modular pinion shaft 100 can be made out of a material that is different than the material which the pinion gear member 110 located at the opposite end is made out of. For another example, one or both of the pinion gear members 110 can be made out of one material that can handle higher stresses, whereas the tubular member 105 can be made out of a different material that is lighter in weight to reduce the overall weight of the modular pinion shaft 100. Considerations may include cost and/or availability of different materials that may be utilized for the fabrication of the modular pinion shaft 100.

While the foregoing is directed to embodiments of the present disclosure, other and further embodiments of the disclosure may be devised without departing from the basic scope thereof, and the scope thereof is determined by the claims that follow.

We claim:

1. A method of manufacturing a reciprocating pump, the method comprising:
coupling a tubular and a first pinion gear comprising first gear teeth together using a first indexing member such that one end of the first indexing member is disposed in a bore formed in the first pinion gear and an opposite end of the first indexing member is disposed in a bore formed in a first end of the tubular;
coupling the tubular and a second pinion gear comprising second gear teeth together using a second indexing member such that an end of the second indexing member is disposed in a bore formed in the second pinion gear and an opposite end of the second indexing member is disposed in a bore formed in a second end the tubular;

mating the first gear teeth of the first pinion gear with a first set of gear teeth of a first bull gear disposed in a housing; and mating the second gear teeth of the second pinion gear with a second set of gear teeth of a second bull gear disposed in the housing, wherein the first bull gear and the second bull gear are coupled to a crankshaft configured to operate the reciprocating pump.

2. The method of claim 1, further comprising:
heat treating the tubular; and
heat treating the first and second pinion gears separately from the heat treating of the tubular.

3. The method of claim 1, wherein the tubular comprises a first material and the first and second pinion gears each comprise a second material.

4. The method of claim 3, wherein:
the first material is different than the second material;
the first pinion gear comprises a first bearing surface positioned axially inward of the first gear teeth and toward the tubular; and
the second pinion gear comprises a second bearing surface positioned axially inward of the second gear teeth and toward the tubular.

5. The method of claim 1, wherein the first and second pinion gears each comprise a first material and the tubular comprises a second material different than the first material.

6. The method of claim 5, further comprising:
heat treating the tubular; and
heat treating the first and second pinion gears separately from the heat treating of the tubular.

7. The method of claim 1, further comprising:
receiving a portion of the first pinion gear in a first recessed portion formed in the first end of the tubular; and
receiving a portion of the second pinion gear in a second recessed portion formed in the second end of the tubular.

8. The method of claim 7, wherein:
the first recessed portion comprises a first shoulder formed in the first end of the tubular;
the first pinion gear comprises a face that extends into the first recessed portion of the tubular and contacts the first shoulder;
the second recessed portion comprises a second shoulder formed in the second end of the tubular;
the second pinion gear includes a face that extends into the second recessed portion of the tubular and contacts the second shoulder; and
the tubular includes a hollow center and an inside diameter, and the first shoulder and the second shoulder are each disposed at the inside diameter.

9. The method of claim 8, wherein:
the bore formed in the first pinion gear is a through-hole extending from an axial inner surface to an axial outer surface of the first pinion gear, and at least a portion of the end of each of the one or more first indexing members is visible in the respective through-hole formed in the first pinion gear; and
the bore formed in the second pinion gear is a through-hole extending from an axial inner surface to an axial outer surface of the second pinion gear, and at least a portion of the end of each of the one or more second indexing members is visible in the respective through-hole formed in the second pinion gear.

10. The method of claim 9, wherein:
the face of the first pinion gear extends past the axial inner surface of the first pinion gear and toward the tubular, and the axial inner surface of the first pinion gear interfaces with the first end of the tubular; and
the face of the second pinion gear extends past the axial inner surface of the second pinion gear and toward the tubular, and the axial inner surface of the second pinion gear interfaces with the second end of the tubular.

11. A method of manufacturing a pinion shaft, the method comprising:
coupling a tubular and a first pinion gear comprising first gear teeth using one or more first indexing members such that an end of each of the one or more first indexing members is disposed in a bore formed in the first pinion gear;
coupling the tubular and a second pinion gear comprising second gear teeth using one or more second indexing members such that an end of each of the one or more second indexing members is disposed in a bore formed in the second pinion gear;
securing the first pinion gear to a first end of the tubular by a first plurality of fasteners; and
securing the second pinion gear to a second end of the tubular by a second plurality of fasteners.

12. The method of claim 11, further comprising:
heat treating the tubular; and
heat treating the first and second pinion gears separately from the heat treating of the tubular.

13. The method of claim 11, wherein the tubular comprises a first material and the first and second pinion gears each comprise a second material.

14. The method of claim 13, wherein:
the first material is different than the second material;
the first pinion gear comprises a first bearing surface positioned axially inward of the first gear teeth and toward the tubular; and
the second pinion gear comprises a second bearing surface positioned axially inward of the second gear teeth and toward the tubular.

15. The method of claim 11, wherein the first and second pinion gears each comprise a first material and the tubular comprises a second material different than the first material.

16. The method of claim 15, further comprising:
heat treating the tubular; and
heat treating the first and second pinion gears separately from the heat treating of the tubular.

17. The method of claim 11, further comprising:
receiving a portion of the first pinion gear in a first recessed portion formed in the first end of the tubular; and
receiving a portion of the second pinion gear in a second recessed portion formed in the second end of the tubular.

18. The method of claim 17, wherein:
the first recessed portion comprises a first shoulder formed in the first end of the tubular;
the first pinion gear comprises a face that extends into the first recessed portion of the tubular and contacts the first shoulder;
the second recessed portion comprises a second shoulder formed in the second end of the tubular;
the second pinion gear includes a face that extends into the second recessed portion of the tubular and contacts the second shoulder; and the tubular includes a hollow center and an inside diameter, and the first shoulder and the second shoulder are each disposed at the inside diameter.

19. The method of claim 18, wherein:

the bore formed in the first pinion gear is a through-hole extending from an axial inner surface to an axial outer surface of the first pinion gear, and at least a portion of the end of each of the one or more first indexing members is visible in the respective through-hole formed in the first pinion gear; and the bore formed in the second pinion gear is a through-hole extending from an axial inner surface to an axial outer surface of the second pinion gear, and at least a portion of the end of each of the one or more second indexing members is visible in the respective through-hole formed in the second pinion gear.

20. The method of claim 19, wherein:

the face of the first pinion gear extends past the axial inner surface of the first pinion gear and toward the tubular, and the axial inner surface of the first pinion gear interfaces with the first end of the tubular; and the face of the second pinion gear extends past the axial inner surface of the second pinion gear and toward the tubular, and the axial inner surface of the second pinion gear interfaces with the second end of the tubular.

* * * * *